United States Patent [19]

Callens et al.

[11] Patent Number: 4,790,015
[45] Date of Patent: Dec. 6, 1988

[54] MULTIRATE DIGITAL TRANSMISSION METHOD AND DEVICE FOR IMPLEMENTING SAID METHOD

[75] Inventors: Paul Callens; Claude Galand, both of Cagnes-Sur-Mer, France

[73] Assignee: International Business Machines Corporation, Armonk, N.Y.

[21] Appl. No.: 31,152

[22] Filed: Mar. 25, 1987

Related U.S. Application Data

[63] Continuation of Ser. No. 485,803, Apr. 18, 1983, abandoned.

[30] Foreign Application Priority Data

Apr. 30, 1982 [EP] European Pat. Off. ........ 82430012.3

[51] Int. Cl.$^4$ .............................................. G10L 5/00
[52] U.S. Cl. ...................................... 381/31; 375/122
[58] Field of Search ................. 370/118, 84, 82, 83, 370/99, 111; 381/29-31, 34; 375/122

[56] References Cited

U.S. PATENT DOCUMENTS

| | | | |
|---|---|---|---|
| 3,437,761 | 4/1969 | Steele | 381/31 |
| 4,086,431 | 4/1978 | Franssen et al. | 381/29 |
| 4,142,071 | 2/1979 | Croisier et al. | 381/29 |
| 4,216,354 | 8/1980 | Esteban et al. | 381/31 |
| 4,229,622 | 10/1980 | Cochrane | 381/41 |
| 4,310,922 | 1/1982 | Lichtenberger et al. | 370/84 |
| 4,330,689 | 5/1982 | Kang et al. | 381/31 |
| 4,457,013 | 6/1984 | Castellino et al. | 370/83 |
| 4,464,782 | 8/1984 | Béraud | 375/122 |

OTHER PUBLICATIONS

Flanagan, *Speech Analysis Synthesis and Perception*, Springer 1972, p. 386.
Goodman, D., "Embedden DPCM for Variable Bit Rate Transmission", IEEE Transaction on Communication, vol. COM28, No. 7, 7/80, pp. 1040-1046.
Boxall, F., "A Digital Carrier–Concentrator System with Elastic Traffic Capacity", IEEE Transaction on Com., vol. 22, No. 10, 10/71, pp. 1636-1642.
G. Kang, L. Fransen, E. Kline, "Mediumband Speech Processor with Baseband Residual Spectrum Encoding", IEEE, ASSP International Conference 1981, pp. 820-823.

*Primary Examiner*—Emanuel S. Kemeny
*Attorney, Agent, or Firm*—John B. Frisone

[57] ABSTRACT

This coder dispatches the bits resulting from the coding operation of a speech signal into a format for transmission at a rate chosen from a plurality of predetermined transmission rates. More specifically, the contents of at least part of the speech signal frequency bandwidth is split into several sub-bands. Said sub-bands are regrouped into sub-groups, each of said sub-groups corresponding to at least one of said possible transmission rates, i.e. to at least one sub-group coding bit rate. The signal samples belonging to each sub-group are recoded through a dynamical allocation of requantizing steps between the sub-bands. The obtained bits resulting from the recoding are dispatched into a multirate frame according to the sub-group which they belong to.

13 Claims, 7 Drawing Sheets

MULTIRATE DIGITAL TRANSMISSION METHOD AND DEVICE FOR IMPLEMENTING SAID METHOD

This is a continuation of application Ser. No. 485,803, filed on Apr. 18, 1983, abandoned.

TECHNICAL FIELD

This invention relates to a multirate digital transmission method and the application thereof to the concentration of digital information originating from a plurality of sources, over a single transmission channel. More specifically, it concerns speech-origin digital data transmission.

BACKGROUND OF THE INVENTION

The conditions for transmitting digital information over a given channel, may be time-varying. It is therefore advantageous to have multirate data transmitters (i.e. transmitters capable of transmitting several different numbers of bits per second) provided with simple means for switching from one rate to another according to the actual transmission conditions.

The cost of the transmission lines, has induced manufacturers to look for transmission methods which allow the transmission of information from a plurality of sources, over a single channel. Digital techniques lend themselves particularly well to this type of operation. To this end, the signals originating from the various analog sources are separately sampled. These samples are digitally coded before being alternately and sequentially transmitted over a single transmission channel, using time-division multiplexing (TDM) techniques. For proper operation of the system, however, it is necessary that each intended receiver located at the other end of the transmission channel, i.e., on the receiving side, retrieves the signal intended for it. In other words, the samples must not only be properly redistributed through a demultiplexing process on the receiving side, but the information contained in the sample stream to be provided to each receiver, must be sufficient for an accurate reconstitution of the original signal. More specifically, when said sources supply speech signals to be transmitted to different called parties, the latter must receive information which is not only intelligible but also of sufficient listening quality. These are two contradictory requirement, that is, (a) efficient utilization of transmission channel bandwidth, and (b) sufficient information to enable accurate reconstruction of the original signal. On the one hand for a signal to be accurately reproduced, the digital representation of a signal must be as precise as possible, i.e., the quantity of the digital data which define this signal must be relatively large. On the other hand, the higher the quantity of data provided by a source within a given time interval, the smaller the number of the sources which can share the same transmission channel.

The solutions to this type of problem are numerous. The multiplicity of these solutions proves the interest of the industry in solving this problem and trying to find efficient solutions. Furthermore, an increased effort can at present be observed in the technical field considered, which shows that the limits to the improvements in the considered system have not yet been attained.

Two lines of research can be defined, the first one dealing with the method for processing of the signal generated by each of the sources, and the second, relating to the management of the various sources.

Since the signals considered here are essentially speech signals, voice characteristics are taken into account to define coding/decoding methods, which, for a minimum quantity of digital information, alter the quality of the speech signal, as little as possible. Many voice signal processing methods have been defined in a number of publications. More specifically, reference should be made to the book by J. Flanagan, entitled: "Speech Analysis Synthesis and Perception", published in 1965 by Springer-Verlag, to become familar with voice coding methods. Another literature source is the IEEE International Conference on Acoustics, Speech and Signal Processing" publication. There will be found therein voice compression techniques the purpose of which is to accurately code the speech signal with a minimum of digital information.

For the management of a plurality of sources for concentrating their outputs over a single transmission channel, multiplexing techniques have already been mentioned. Such techniques are roughly based on a sequential and cyclical allocation of the transmission channel to each of the sources. The limitations of such techniques can easily be understood. It is apparent that channel transmission capacity (the number of bits per second) should not, in principle, be lower than the sum of the bits supplied by the various sources during the same time. However, speech signal sources are characterized by having periods of intermittent activity. More specifically, a source which seems active at a given moment, to a person engaged in a conversation has alternating of periods of silence or inactivity embedded within periods of activity are detected. Techniques have been developed which use the presence of these periods of inactivity in order to associate a single transmission channel with a group of "L" sources, where L might seem an excessive number. TASI (Time Assignment Speech Interpolation) is one example of a channel sharing technique. Such techniques use a device for identifying the sources of the group which, at a given moment, can be considered as being effectively active (according to a predetermined criteria) and for allocating the transmission channel to these sources only. The number L is defined by statistical rules with all the risks this implies in a practical application. For instance, during periods of extensive activity, a TASI type multiplexing system may have to delay the transmission of the signals coming from some sources, or to freeze out these sources, in other words, interrupt their speech. All these solutions are, of course, unacceptable in a real-time high quality conversational system.

Finally, one can combine compression techniques which compress the speech signal supplied by each of the source, with the technique of multiplexing the group of the L sources. But there is a risk of adding an excessive complexity to the system which would jeopardize any commercial application. From amongst the methods that make use of such combinations, one can mention the method proposed by David J. Goodman in an article published in the IEEE Transactions on Communications, Vol. COM-28, No. 7, July 1980, on page 1040 and following, under the title "Embedded DPCM for Variable Bit Rate Transmission".

In Goodman, the speech signal of each of the sources of the described system is, first, coded at a relatively high bit rate (maximum rate). Next the bits obtained through coding the samples of each speech signal, are placed in the bit stream to be transmitted, according to a pre-established order based on bit weight. This order is such that, transmision of the coded signal at a transmission rate corresponding to a coding rate lower than the maximum rate, the operations to be carried out are extremely simple, i.e. bits are dropped. The number of possible transmission rates according to the techniques proposed by David J. Goodman, is however relatively limited, because only rates which are multiples of the signal sampling frequency can be used.

SUMMARY OF THE INVENTION

One object of this invention is to provide a simple and effective multirate digital speech signal transmission method.

Another object of this invention is to provide a method for concentrating speech signals supplied by a group of L sources, over a single transmission channel, by means of compression techniques and multiplexing techniques which can be combined with one another, in a simple manner.

Still another object of this invention is to provide concentrating techniques avoiding any delay or freezing of any source output, during periods of traffic congestion.

This invention concerns, more, particularly a method for compressing the signal from each source by means of techniques employing splitting of the frequency bandwidth of the corresponding speech signal into a given number of sub-bands. The sub-bands are re-grouped into sub-groups the number of which is defined as a function of the number of possible transmission rates. The coding bit rate of each sub-group is defined as a function of one of said possible transmission rates. The sub-band signals in each sub-group are quantized through a dynamic allocation of the quantizing bit resources (coding rate) allocated to the sub-group. The bits obtained through coding of the signals in each sub-group considered over a given time period, are dispatched over a repetitive frame comprising predetermined zones, each of said zones being intended for receiving the bits corresponding to the coding of the signals supplied by predetermined sub-bands belonging to the same sub-group. Once the effective transmission rate at a given moment has been chosen, each frame is eventually truncated, before transmission, by dropping all zones which were coded at a rate higher than the chosen transmission rate.

The above process is particularly well-adapted for concentrating speech signals originating from several sources, over one transmission channel, by allocating the highest coding rates to the more active sources.

The foregoing and other objects, features and advantages or the invention will be apparent from the following more particular description of a preferred embodiment of the invention, as illustrated in the accompanying drawings.

DETAILED DESCRIPTION OF THE PREFERRED EMBODIMENT

The process proposed by David J. Goodman maintains the frequency band-width of the processed signal, constant. Thus, the available coding bits are always used to code the same number of samples since the Nyquist frequency is invariant.

But it may be advantageous to reach a compromise between the frequency bandwidth assigned to the signal to be transmitted and the average number of the bits available for coding each sample of said signal.

Copending U.S. application Ser. No. 458,796, filed on Jan. 18, 1983 disclosed a method for dynamically reaching such a compromise. Such a method includes arranging the bits obtained by coding the signal by dispatching said bits within a frame having a predetermined format. Some already known basic principles are used in this method. Using these same basic principles, namely, the so-called bit block coding and sub-band coding with a dynamic allocation of the quantizing bit rates between the sub-bands, the present invention proposes a novel transmission process particularly suitable for specific applications.

The so-called block coding principle is disclosed in an article referring to a presentation given by A. Croisier at the International Seminar of Digital Communications held in Zurich, in 1974, under the title: "Progress in PCM and Delta Modulation: Block Companded Coding of Speech Signal" (BCPCM). A Croisier proposes to code fixed length (e.g. 20 ms) consecutive segments of speech signal. A scale factor (or a characteristic term) of the signal to be coded is defined for each signal segment according to the signal amplitude swing within the segment. This characteristic term is a function of the segment dynamics and is used as a reference to the coding of said segment. More specifically, since the speech signal is sampled at its Nyquist frequency, each signal segment supplies a sample block. The characteristic term C must be such that the largest sample in the block shall not be beyond the coding limits during the considered time interval.

For instance, for a block containing N samples, the characteristic term "C" can be chosen by sorting these N samples to detect the largest sample therein and allocate the value thereof to "C".

As to the sub-band coding operation which the samples in each block will be subjected to, it is disclosed in U.S. Pat. Nos. 4,142,071 and 4,216,354 herein incorporated by reference as well as the presentation given by D. Esteban el al at the IEEE Conference held at Tulsa, U.S. April 10–12, 1978. The elements necessary for the embodiment of this invention will be received here with a few modifications in the notations which, even though obvious, will be specified when necessary in order to avoid any ambiguity.

For the sub-band coding, it should be understood that the speech signal frequency bandwidth is split into "p" sub-bands. The samples provided in each sub-band are quantized (or requantized) with a variable precision based on the relative energy of the signal contained in said sub-band. In other words, for a given fixed overall quantizing bit rate, the specific rate allocated to each sub-band will be time-varying as a function of the relative energy of the signal contained in said sub-band.

As it will appear in the following description, the process of this invention applies to any type of sub-band coding method. It, more particularly, applies to sub-band coding of the type disclosed in U.S. Pat. No. 4,142,071 wherein the whole frequency bandwidth of the speech signal to be transmitted is split into a plurality of sub-bands. It also applies to a sub-band coding wherein only a so-called base band of the speech signal to be transmitted is split into sub-bands. An embodiment of a coder of such a type, is disclosed in the above-mentioned U.S. Pat. No. 4,216,354. An embodiment similar to this same type of coder, has also been disclosed by D. Esteban et al at the Tulsa Conference, under the title "9.6/7.2 Kbps Voice Excited Predictive Coder (VEPC)".

Figure 1:
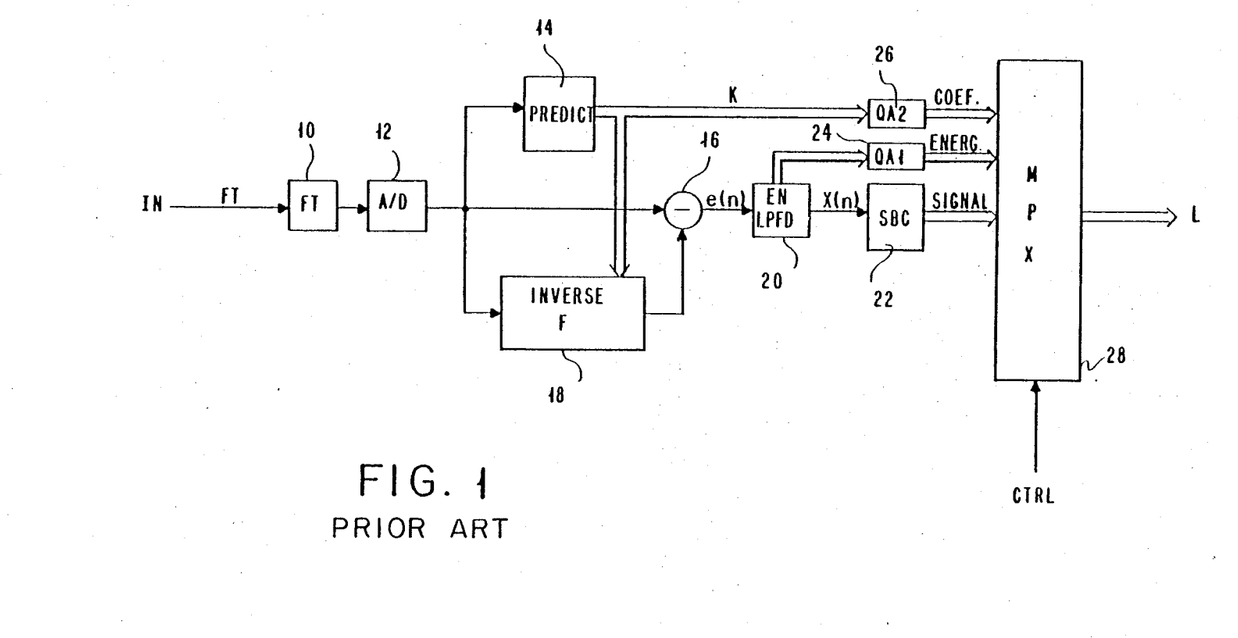
FIG. 1, is a type of voice coder such as used in this invention.

FIG. 1 illustrates a VEPC type coder. The speech signal applied to the coder input IN is low pass filtered in 10. The low-pass filtered signal has a frequency bandwidth $\leq$3400 Hz (telephone bandwidth). The filter 10 output is fed into an analog-digital (A/D) converter 12 performing sampling operations at 8 KHz and 12 bit PCM encoding operations. The coded samples are then recoded in the rest of the VEPC coder to enable a more efficient encoding. To this end, the samples are fed into a parameter predictor 14 as well as into a subtractor 16 and an inverse filter 18. The predictor 14 generates a group of partial autocorrelation coefficients (PAR-COR) (K), from the signal provided by A/D 12. These coefficient are used to adjust the inverse filter 18 for a predetermined period of time e.g. equal to 20 ms or lower. The inverse filter is made of a lattice network such as defined by J. D. Markel et al in their book entitled: "Linear Prediction of Speech", paragraph 5.4. The signal supplied by the inverse filter 18 is the predictable portion of the speech signal. The subtractor 16, which substracts the inverse filtered signal from the signal supplied by the converter 12, provides a residual signal $e_{(n)}$ free of the original speech signal redundancy. The residual signal $e_{(n)}$ is then base-band filtered in 20. The filter 20 supplies samples X(n) of the residual base-band signal limited to a frequency, say, $\leq$2 KHz, as well as information relative to the energy of the signal in the removed high frequency band. The residual base-band signal is fed into a sub-band coder 22. Said coder requantizes the residual base-band signal, dynamic allocation of the quantizing bits and provides an information designated by SIGNAL. The energy of the high frequency band (1625–3400 Hz, for instance) is requantized in a quantizer QA1, 24 supplying information designated by ENERG (or E). As to the partial autocorrelation coefficients, the so-called PARCOR coefficients, they are recoded through a requantizing operation in QA2, 26 to supply information designated by COEFF (or K). These three types of information, namely COEF (K), ENERG (E) and SIGNAL are a coded representation fully characterizing the speech signal applied to the coder input IN. They may be transmitted over line L by a multiplexer 28.

It should be remembered, first, that since the system is BCPCM-operated, the speech signal is processed by blocks of N samples which are representative of consecutive 20-milliseconds long signal segments.

The parameter predictor 14 is, more specifically, disclosed in detail in U.S. Pat. No. 4,216,354, and more precisely it is represented in the FIGS. 6 and 7 of said patent. The method on which the device is based, implements, more particularly, the algorithms proposed by J. Le Roux and C. Guegen in an article published by IEEE Transactions on Acoustics, Speech and Signal Processing, June 1977.

The device 20 is comprised of a digital low-pass filter the higher frequency of which is limited to $\leq$2000 Hz; e.g. equal to 1675 Hz. This device 20, furthermore, is comprised of means for measuring the energy E contained in the high frequency range 1625–3400 Hz removed by the low-pass filter of device 20. An embodiment of device 20 is disclosed in U.S. Pat. No. 4,216,354 (more specifically, reference should be made to FIG. 2 of said patent). The energy information contained within the high frequency bandwidth of the residual signal, is quantized in 24 and this, every 10 milliseconds, i.e. twice for each 20 millisecond signal segment.

The samples X(n) of the residual base-band signal come out of the low-pass filter 20 at a 4 KHz rate. The residual base-band signal is subjected to a sub-band BCPCM-type recoding operation in coder 22 with a dynamic allocation of the quantizing bit rates between the sub-bands. This type of coding is disclosed in the above-mentioned documents.

A few rules will be briefly reviewed. Let p be the number of the sub-bands into which the frequency bandwidth of the signal to be recoded is divided. Let N be the number of the samples in each sub-band during a 20 ms time-interval which corresponds to a signal segment to be BCPCM-recoded. Finally, let X(i,j) be the jth sample of an N-sample block in the $i^{th}$ sub-band. For each sub-band signal segment, the characteristic sub-band term C(i) is determined, which meets relationship:

$$C(i) = \text{Max}(|X(i,j)|) \qquad (1)$$
$$j = 1, \ldots, N$$

This involves sorting the samples in each block so as to determine therefrom the highest absolute value sample and to allocate such a value to C(i). p characteristic terms C(1), C(2), . . . , C(p), then, are obtained. These terms are eventually requantized through a logarithmic table look-up so as to reduce the number of bits assigned to the coding of the C(i)'s. The recoded terms C(i) can be denoted (i).

In addition, the samples X(i,j), are (re)quantized so that the corresponding (re)quantizing step is defined as a function of the sub-band which the processed sample belongs to, or, more specifically, as a function of the relative energy contained in said sub-band with respect to the energies contained in the other sub-bands during the same time interval. It can be shown that for a (re)quantizing bit rate per sub-band sampling period and intended for the (re)quantizing of the p sub-band samples, the global quantizing signal-to-noise ratio is minimized by allocating a number of bits n(i) to the requantizing of the $i^{th}$ sub-band, which meets relationship:

$$n(i) = \frac{1}{p}\left[M - \sum_{j=1}^{p} \log C(j)\right] + \log C(i) \qquad (2)$$

where $i = 1, 2, \ldots, p$ and $$\sum_{i=1}^{p} n(i) = M \qquad (3)$$

which establishes that the (re)quantizing rates are dynamically allocated.

In practice, equation (3) is never directly met without a few readjusments such as disclosed in the above-mentioned pror art documents.

More specifically, when the terms resulting from decoding the (i)s are denoted $\widetilde{C}(i)$, in practice, expression (2) is replaced by $$n(i) = \frac{1}{p}\left[M - \sum_{j=1}^{p} \log\widetilde{C}(j)\right] + \log\widetilde{C}(i) \quad (4)$$

For the requirements of this invention, the sub-bands are regrouped into several sub-groups and the number M, i.e., the quantizing rate, varies from one sub-group to another. The number of the sub-groups is defined according to the number of the predetermined rates at which transmission is proposed. The selected transmission rates are 2.4; 4.8; 7.2; 9.6 and 12 Kbps. Every 20 ms the total number of the coding bits, then, will be different, namely, 48 bits for a 2.4 Kbps transmission; 96 bits for a 4.8 Kbps transmission; 144 bits for a 7.2 Kbps transmission; 192 bits for a 9.6 Kbps transmission and 240 bits for a 12 Kbps transmission. After subtracting the number of bits to be assigned to coding the:

energies (E): 4 bits for 2.4 kbps transmission rate or 8 bits for 4.8, 7.2, 9.6, or 12 kbps transmission rates, PARCOR coefficients (K): constant at 28 bits, characteristics terms (C): 6, 18, 26, 38, or 50 bits for transmission rates of 2.4, 4.8, 7.2, 9.6 or 12 kbps, respectively, from the total number of coding bits; that is, 48, 96, 144, 192, and 240 bits for transmission rates of 2.4, 4.8, 7.2, 9.6, or 12 kbps, respectively, one gets the number of bits remaining for requantizing of the samples; that is, 10, 40, 80, 115, or 150 for transmission rates of 2.4, 4.8, 7.2, 9.6, or 12 kbps, respectively. The chosen bit allocations are summarized in Table I. It should be noted that some bits are unassigned. One should also note the expression "macro-sample" which designates the group of samples provided by the sub-bands belonging to a given sub-group, when considered over the same 20 ms sampling period.

TABLE I

| Bit rates (Kbps) | 2.4 SG0 | 4.8 SG1 | 7.2 SG2 | 9.6 SG3 | 12 SG4 |
| --- | --- | --- | --- | --- | --- |
| Frequency bandwidth (Hz) for each sub-group | 250–750 | 250–750 | 125–875 | 125–1250 | 125–1625 |
| Total Nb of available coding bits/20 ms | 48 | 96 | 144 | 192 | 240 |
| Nb of sub-bands in each sub-group | 4 | 4 | 6 | 9 | 12 |
| Nb bits for C(i)'s | 4 + 2 | 16 + 2 | 24 + 2 | 36 + 2 | 48 + 2 |
| Nb of bits for E's in a block | 4 | 8 | 8 | 8 | 8 |
| Nb of bits for K's | 28 | 28 | 28 | 28 | 28 |
| Nb of bits/20 ms sample (sub-group coding rate) | 10 | 40 | 80 | 115 | 150 |
| Nb of bits for each macro-sample | 2 | 8 | 16 | 23 | 30 |
| Nb of bits used every 20 ms | 48 | 94 | 142 | 189 | 236 |
| Nb of unassigned bits | 0 | 2 | 2 | 3 | 4 |

Figure 2:
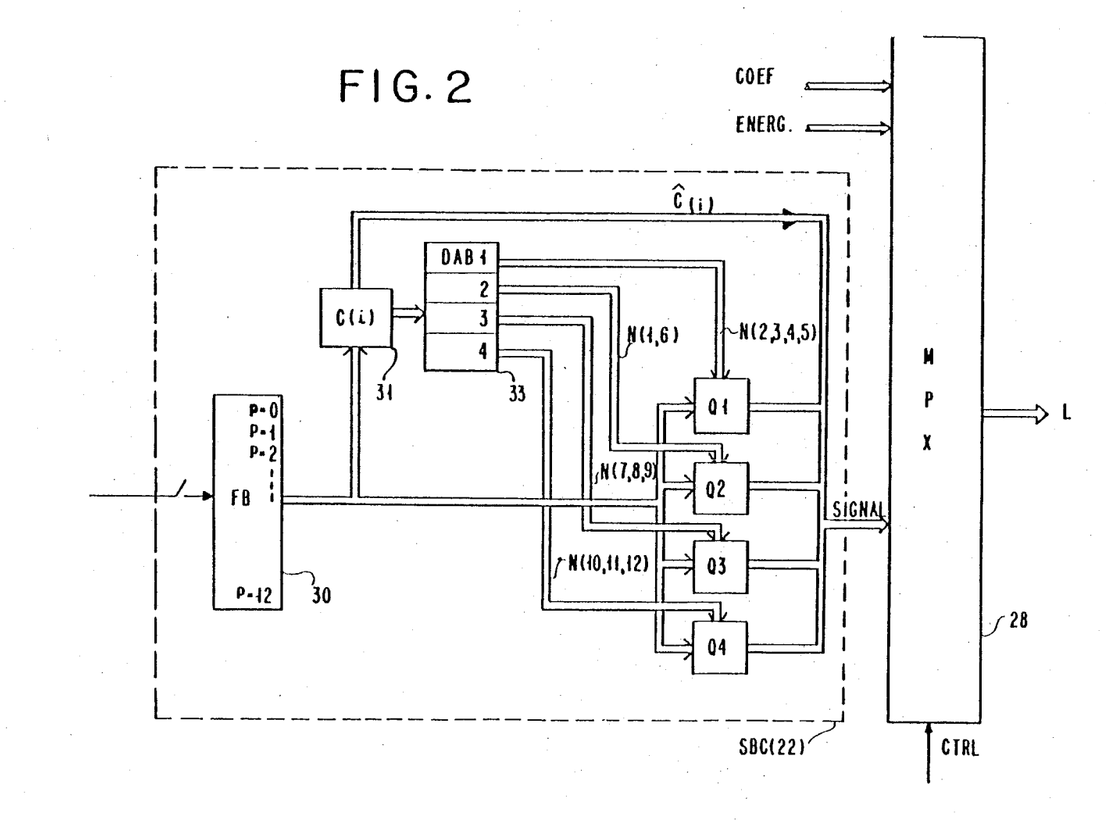
FIG. 2, is an embodiment of the coder of FIG. 1 modified to meet the requirements of this invention.

FIG. 2 illustrates an embodiment of the sub-band coder 22 modified for implementing this invention. The coder 22 is comprised, first, of a filter bank 30 (FB) splitting the frequency bandwidth of the residual baseband signal into 12 adjacent sub-bands distributed according to the following Table II.

TABLE II

| Sub-band rank | Limit Frequencies in Hz | Sub-Grouping Transmission speed shown in Kbps | | | |
| --- | --- | --- | --- | --- | --- |
| 0 | 0–0125 | | | | |
| 1 | 125–0250 | | | | |
| 2 | 250–0375 | DAB1 2.4 et 4.8 | DAB2 7.2 | DAB3 9.6 | DAB4 12 |
| 3 | 375–0500 | | | | |
| 4 | 500–0625 | | | | |
| 5 | 625–0750 | | | | |
| 6 | 750–0875 | | | | |
| 7 | 875–1000 | | | | |
| 8 | 1000–1125 | | | | |
| 9 | 1125–1250 | | | | |
| 10 | 1250–1375 | | | | |
| 11 | 1375–1500 | | | | |
| 12 | 1500–1625 | | | | |

The filter bank 30 includes half-band quadrature filter cells such as disclosed in IBM Technical Disclosure Bulletin, Vol. 19, No. 9, February 1977, pages 3438–39.

The 0–125 Hz sub-band is not used. The other sub-bands are grouped into sub-groups according to the indications in Tables I and II, and subjected to Dynamic Bit Allocators DAB1 through DAB4 which determine the dynamic bit allocations, to be made within each sub-group for each of the concerned macro-samples. This, of course, sets the number of quantizing steps for the samples. Each sub-group corresponds to at least one of the possible transmission rates. The transmission rate in each sub-group determines the coding bit rate in the sub-group.

Device DAB1 handles sub-bands 2 through 5 regrouped into a first sub-group SG1. DAB1 calculates, from those terms C(i) which are provided thereto by a generator (31), the dynamic allocation of a given fixed number of bits M1, i.e. M1=8 bits to be distributed between sub-bands 2 through 5 during each macro-sample. See Table I, 9th horizontal row, e.g. M1=8 for a coding bit rate of 4.8 kbps.

When denoting:

$$\beta_1 = \frac{1}{4}\left(8 - \sum_{j=2}^{5} \log\widetilde{C}(j)\right) \quad (5)$$

the number of quantizing bits N(i) to be dynamically allocated among the sub-bands in sub-group SG1 is:

$$N(i) = \beta_1 + \log \widetilde{C}(i) \quad (6)$$

for i=2, 3, 4 and 5.

DAB2 calculates the dynamic allocation of 8 additional bits to sub-bands 1 and 6 (added to sub-group SG1 in order to form sub-group SG2), for which $$\beta_2 = \tfrac{1}{2}(8 - \log \widetilde{C}_1 - \log \widetilde{C}_6) \quad (7)$$

$$N(1) = \beta_2 + \log \widetilde{C}_1 \quad (8)$$

$$N(6) = \beta_2 + \log \tilde{C}_6 \qquad (9)$$

DAB3 calculates the allocation of 7 additional bits to be spread between sub-bands 7, 8, 9 (to be added to SG2 in order to obtain sub-group SG3)

$$\beta_3 = \frac{1}{3}\left(7 - \sum_{j=7}^{9} \log \tilde{C}(j)\right) \qquad (10)$$

$$N(i) = \beta_3 + \log \tilde{C}(i) \quad i = 7,8,9 \qquad (11)$$

Finally, DAB4 allocates dynamically 7 additional bits to be spread between sub-bands 10, 11, 12 (to be added to SG3 in order to obtain sub-group SG4)

$$\beta_4 = \frac{1}{3}\left(7 - \sum_{j=10}^{12} \log \tilde{C}(j)\right) \qquad (12)$$

$$N(i) = \beta_4 + \log \tilde{C}(i) \quad i = 10,11,12 \qquad (13)$$

Circuits DAB1 through DAB4 have been grouped into a dynamic bit allocator 33.

In practice, each of the calculated N(i)'s will have to be adjusted to an integer value so that the sum of the N(i)'s determined by each of the devices DAB1 through DAB4 is equal to the sub-group predetermined allocated number of bits. Such an adjustment is carried out by means of the technique already used and described in the above-mentioned references. The sum of the N(i)'s for the 12 sub-bands is equal to 30 for each macro-sample, i.e., to the number of the bits for each macro-sample defined for the highest transmission bit rate (see Table I). The (re)quantizing dynamic allocations at 2400 bps (sub-group SG0) have not been described above. This transmission rate is processed in a specific manner as will be disclosed later on.

Once number of bits to be allocated to the quantization of signal samples from each sub-band, has been defined, the signal samples are requantized in Q1 through Q4. The bits of re-quantized samples are then formatted as described below by referring to an example.

The assembly (31, 33, Q1, Q2, Q3, Q4) regroups, therefore, the sub-bands into sub-groups and requantizes the signals in each sub-band relative to the sub-group.

By way of an example, it will be assumed that devices DAB1 through DAB4, using formulae 5 through 13, supply the following values:

| | |
|---|---|
| DAB1 | N(2) = 2 |
| | N(3) = 1 |
| | N(4) = 2 |
| | N(5) = 3 |
| DAB2 | N(1) = 5 |
| | N(6) = 3 |
| DAB3 | N(7) = 1 |
| | N(8) = 4 |
| | N(9) = 2 |
| DAB4 | N(10) = 2 |
| | N(11) = 4 |
| | N(12) = 1 |

It should be noted that $$\sum_{i=1}^{12} N(i) = 30$$

These N(i) rates are used to adjust the requantizing steps of requantizing units Q1 through Q4 which process the samples in sub-groups SG1 through SG4, respectively. The requantizing step Q(i) of the ith sub-band is such that:

$$Q(i) = \tilde{C}(i)/2^{N(i)-1}$$

The requantized samples (i,j) satisfy relationship:

$$X(i,j) = ||X(i,j)/Q(i)|| \qquad (14)$$

where symbol $||.||$ indicates that the obtained values are truncated to the next lower integer values.

Figure 3:
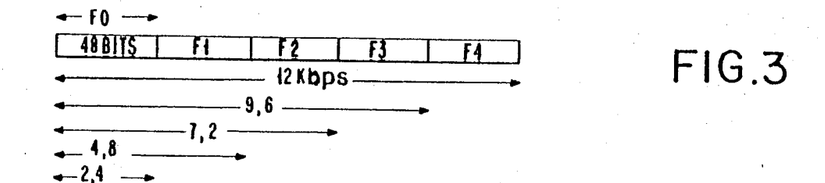
FIG. 3, is an illustration of general format used according to the process of this invention for arranging a block of bits.

The bits resulting from the coding operation of each 20 ms segment of voice signal, are distributed by multiplexer 28 into a frame (see FIG. 3) comprised of a plurality of zones (F0, F1, ... ). A block of bits distributed according to a multirate frame is, therefore, obtained every 20 ms. In the chosen example, there are five zones designated by F0, F1, F2, F3 and F4. According to the required transmission rate, there will be transmitted a more or less large portion (number of the zones) of the multirate frame or block of bits.

Assuming:

$X^p_{(i,j)}$ = the $p^{th}$ bit in the $j^{th}$ requantized sample of the $i^{th}$ sub-band.

p=0 is representative of the least significant bit, i.e. that bit which has the lowest weight.

$C^p_{(i)}$ = is representative of the $p^{th}$ bit of the coded characteristic of the $i^{th}$ sub-band.

$E_1$, $E_2$ = are the two energy values (on channel ENERG) determined for each 20 ms segment of the original voice signal to be coded. Terms $E_1$ and $E_2$ are coded in QA1, with four bits, each. $E_1^p$ and $E_2^p$ are the $p^{th}$ bits of $E_1$ and $E_2$.

$K_l^p$ = with l = 1, 2, ..., 8, is representative of the $p^{th}$ bit of the $l^{th}$ PARCOR coefficient defined for the signal segment.

The PARCOR coefficients are coded in QA2 according to the method disclosed in "Piecewise Linear Quantization of LPC Reflection Coefficients" by C. Un and S. Yang in the document entitled "International Conference on Acoustics, Speech and Signal Processing" (ICASSP), Hartford 1977, on pages 417 through 420. More specifically, 28 bits are reserved for the PARCOR coefficients (see Table I), which are distributed as follows:

$K_1$: 5 bits
$K_2$: 5 bits
$K_3$ through $K_8$: 3 bits each

It has been mentioned above that a special handling is reserved for the 2400 bps rate. In that case, a single sub-band is preserved, namely, the sub-band which contains the highest energy, from amongst the sub-bands 2, 3, 4 and 5 (sub-group 1). In addition, only the two highest weight bits in the samples of this sub-band, that are supplied by quantizer Q1, are to be used. The designation of the concerned sub-band is defined by two bits denoted P0 and P1 and satisfying the requirement in Table III.

TABLE III

| P0 | P1 | Sub-band |
|----|----|----------|
| 0  | 0  | 2        |
| 0  | 1  | 3        |
| 1  | 0  | 4        |
| 1  | 1  | 5        |

In the above-mentioned example, the reserved bits to be used are the two highest weight that is, bits 1 and 2 in each sample of sub-band 5. The coded signal bit samples in zone F0, in this specific example, will be.

| $X_{5,1}^2$ | $X_{5,2}^2$ | $X_{5,3}^2$ | $X_{5,4}^2$ | $X_{5,5}^2$ |
|---|---|---|---|---|
| $X_{5,1}^1$ | $X_{5,2}^1$ | $X_{5,3}^1$ | $X_{5,4}^1$ | $X_{5,5}^1$ |

Furthermore, for this 2400 bps transmission rate, only one high frequency energy value will be retained, namely, $E_1$ comprising 4 bits.

Zone F0, therefore, contains

Figure 4:
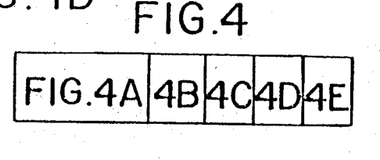
FIGS. 4, 4A, 4B, 4C, 4D and 4E show in detail an example of a block of bits formated according to FIG. 3.
Figure 4A:
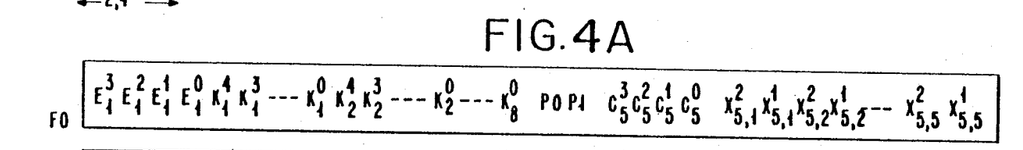

|         |         |         | $X_{5,j}^2$ | $j = 1, \ldots, 5$ |
|---------|---------|---------|---------|---------|
|         |         |         | $X_{5,j}^1$ | $j = 1, \ldots, 5$ |
|         |         |         | P0, P1  |         |
| $E_1^3$ | $E_1^2$ | $E_1^1$ | $E_1^0$ |         |
| $C_5^3$ | $C_5^2$ | $C_5^1$ | $C_5^0$ |         |
| $K_1^4$ | $K_1^3$ | $K_1^2$ | $K_1^1$ | $K_1^0$ |
| $K_2^4$ | $K_2^3$ | $K_2^2$ | $K_2^1$ | $K_2^0$ |
| $K_3^2$ | $K_3^1$ | $K_3^0$ |         |         |
| $K_4^2$ | $K_4^1$ | $K_4^0$ |         |         |
| $K_5^2$ | $K_5^1$ | $K_5^0$ |         |         |
| $K_6^2$ | $K_6^1$ | $K_6^0$ |         |         |
| $K_7^2$ | $K_7^1$ | $K_7^0$ |         |         |
| $K_8^2$ | $K_8^1$ | $K_8^0$ |         |         | for a total of 48 bits. Thus at a transmission rate of 2400 bps, the above defined 48 bits in zone F0, distributed according to the schematic diagram of FIG. 4A, are transmitted every 20 ms.

Figure 4B:
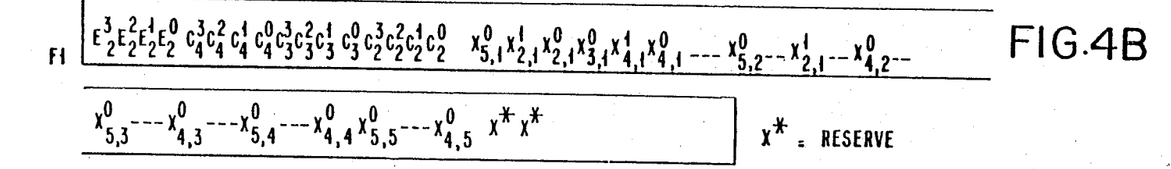

Zone F1, which is illustrated in FIG. 4B contains:

| $C_4^3$ | $C_4^2$ | $C_4^1$ | $C_4^0$ |
|---|---|---|---|
| $C_3^3$ | $C_3^2$ | $C_3^1$ | $C_3^0$ |
| $C_2^3$ | $C_2^2$ | $C_2^1$ | $C_2^0$ |
| $E_2^3$ | $E_2^2$ | $E_2^1$ | $E_2^0$ |

| $X_{5,j}^0$ | $j = 1, \ldots, 5$ |
|---|---|
| $X_{2,j}^1$ | $j = 1, \ldots, 5$ |
| $X_{2,j}^0$ | $j = 1, \ldots, 5$ |
| $X_{3,j}^0$ | $j = 1, \ldots, 5$ |
| $X_{4,j}^1$ | $j = 1, \ldots, 5$ |
| $X_{4,j}^0$ | $j = 1, \ldots, 5$ | for a total of 94 bits plus two reserved bits which are not used when the signal is decoded at the receiver. (represented by X* in FIG. 4B).

Thus, at a transmission rate of 4800 bps, the 48 bits of zone F0, previously defined, and the above defined 48 bits of zone F1, distributed according to the schematic diagram of FIG. 4A, are transmitted every 20 ms.

Figure 4C:
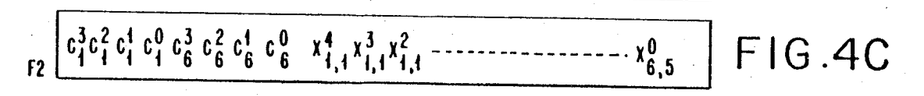

Zone F2 is represented in FIG. 4C and contains:

| $C_1^3$ | $C_1^2$ | $C_1^1$ | $C_1^0$ |
|---|---|---|---|
| $C_6^3$ | $C_6^2$ | $C_6^1$ | $C_6^0$ |

| $X_{1,j}^4$ | $j = 1, \ldots, 5$ |
|---|---|
| $X_{1,j}^3$ | $j = 1, \ldots, 5$ |
| $X_{1,j}^2$ | $j = 1, \ldots, 5$ |
| $X_{1,j}^1$ | $j = 1, \ldots, 5$ |
| $X_{1,j}^0$ | $j = 1, \ldots, 5$ |
| $X_{6,j}^2$ | $j = 1, \ldots, 5$ |
| $X_{6,j}^1$ | $j = 1, \ldots, 5$ |
| $X_{6,j}^0$ | $j = 1, \ldots, 5$ | for a total of 48 bits.

Zone F2, therefore, contains the bits from sub-bands 1 and 6 to be added to the sub-groups corresponding to the immediately lower rate (4800 bps) in order to form the sub-group at the next higher rate (7200 bps).

Thus, at a transmission rate of 7200 bps, the 48 bits of zone F0 and the 48 bits of zone F1, previously defined, and the above defined 48 bits of zone F2, distributed according to the schematic drawing of FIG. 4C, are transmitted every 20 ms.

The following zones F3 and F4 will be processed likewise.

Figure 4D:
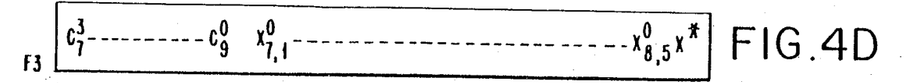

Zone F3 illustrated in FIG. 4D, contains:

| $C_7^3$ | $C_7^2$ | $C_7^1$ | $C_7^0$ |
|---|---|---|---|
| $C_8^3$ | $C_8^2$ | $C_8^1$ | $C_8^0$ |
| $C_9^3$ | $C_9^2$ | $C_9^1$ | $C_9^0$ |

| $X_{7,j}^0$ | $j = 1, \ldots, 5$ |
|---|---|
| $X_{8,j}^3$ | $j = 1, \ldots, 5$ |
| $X_{8,j}^2$ | $j = 1, \ldots, 5$ |
| $X_{8,j}^1$ | $j = 1, \ldots, 5$ |
| $X_{8,j}^0$ | $j = 1, \ldots, 5$ |
| $X_{9,j}^1$ | $j = 1, \ldots, 5$ |
| $X_{9,j}^0$ | $j = 1, \ldots, 5$ | for a total of 47 bits plus one reserved bit which is not used when the signal is decoded at the receiver.

Thus at a transmission rate of 9600 bps, the 144 bits of zones F0, F1, and F2, previously defined, and the above defined 48 bits of zone F3, distributed according to the schematic of FIG. 4D, are transmitted every 20 ms.

Figure 4E:
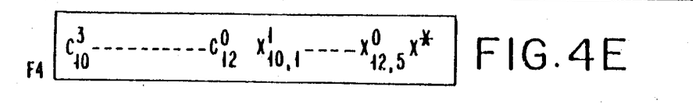

Finally, zone F4 illustrated in FIG. 4E, contains:

| $C_{10}^3$ | $C_{10}^2$ | $C_{10}^1$ | $C_{10}^0$ |
|---|---|---|---|
| $C_{10}^0$ | $C_{11}^1$ | $C_{11}^1$ | $C_{11}^0$ |
| $C_{12}^1$ | $C_{12}^1$ | $C_{12}^1$ | $C_{12}^1$ |

| $X_{10,j}$ | $j = 1, \ldots, 5$ |
|---|---|
| $X_{10,j}$ | $j = 1, \ldots, 5$ |
| $X_{11,j}$ | $j = 1, \ldots, 5$ |
| $X_{11,j}$ | $j = 1, \ldots, 5$ |
| $X_{11,j}$ | $j = 1, \ldots, 5$ |
| $X_{11,j}$ | $j = 1, \ldots, 5$ |
| $X_{12,j}$ | $j = 1, \ldots, 5$ | for a total of 47 bits plus one reserved bit which is not used when the signal is decoded at the receiver.

Thus, at a transmission rate of 12000 bps, the 192 bits of zones F0, F1, F2 and F3, previously defined, and the above defined 48 bits of zone F4, distributed according to the schematic of FIG. 4E, are transmitted every 20 ms.

The bits obtained at the outputs of the quantization devices Q1 through Q4 are multiplexed in 28 according to the format of the multirate frame comprised of zones F0 through F4. Once the transmission rate has been chosen, a control is applied to multiplexer 28 through line CTRL. Such a control is used to truncate, if at all, each multirate frame, to the required dimensions before its being transmitted over line L connected to multiplexer 28.

Figure 5:
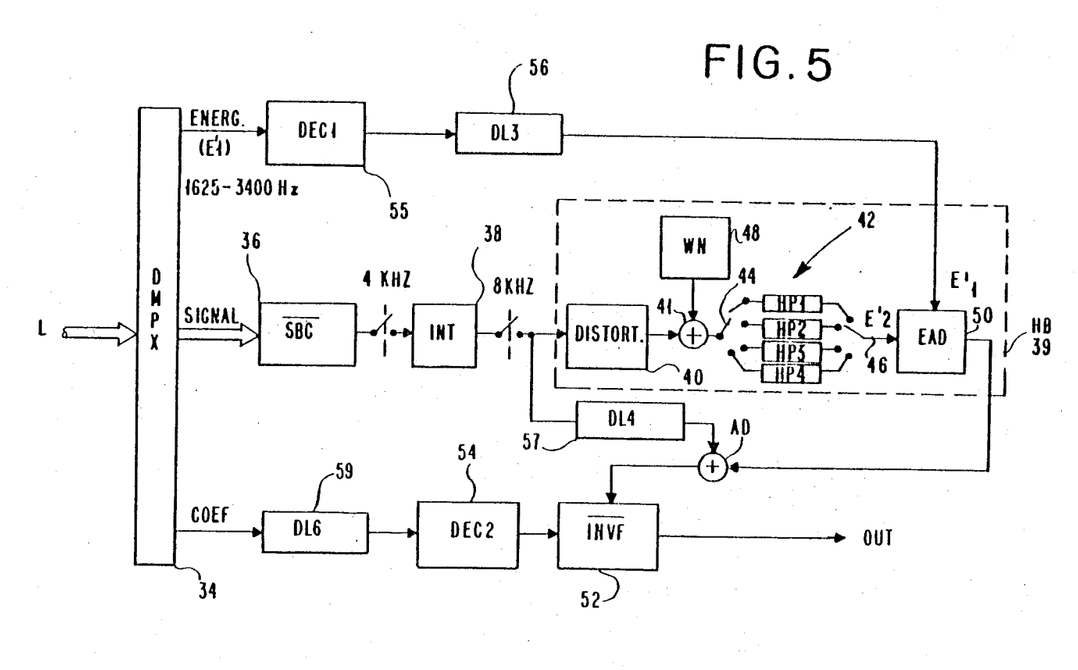
FIG. 5, is an embodiment of the receiver to be used in this invention.

FIG. 5 illustrates a schematic diagram of the receiver of the VEPC type similar to the prior art receiver (more specifically, reference should be made to FIGS. 7 through 9 of U.S. Pat. No. 4,216,354) modified according to the requirements of this invention. The data on input line L are, first, demultiplexed in 34 (DMPX). Demultiplexer 34 separates the elements of information on the channels ENERG (E), SIGNAL and COEF (K), from one another.

The information SIGNAL is, first, decoded in 36 ($\overline{SBC}$) to provide the samples of the residual base band signal. These samples are subjected, in 36, to inverse quantization operations associated with filtering and interpolation operations intended to recombine the sub-bands into the original base band. The filtering operation is carried out by means of elements which are high-pass and low-pass half-band quadrature filters, respectively. The interpolation operation is obtained by inserting a zero between two consecutive input samples. Then, the outputs of the filters are added two by two. For further details, reference should be made to the above-mentioned literature.

The base-band signal sampling frequency is brought back to 8 KHz by interpolator 38 (INT). Such a device computes the samples to be inserted between two consecutive 4 KHz samples. The interpolation operation can be carried out by means of a filter. The path followed by the interpolator output is split into two paths, one being direct, the other one being indirect. The indirect path includes a high frequency band generator 39 (HB). The low-band frequency spectrum is spread through a non-linear distortion operation performed in 40 (DISTORT). Then the high frequency bands are generated through a filtering operation in 42. The output of the filtering means 42 is then modulated by the energy information provided by channel ENERG receiving the energy information and decoding it in decoder DEC1. According to the bit rate at the receiver input, the higher limit of the base-band is known (see Table II). The high frequency band is, therefore, dependent on the chosen transmission rate. The high pass filter 42 shall be chosen accordingly. More specifically, for 2400 and 4800 bps, the bandwidth of filter 42 is set to 750–3400 Hz; for 7200 bps, it is set to 875–3400 Hz; for 9600 bps and 12 000 bps, it is set to 1250–3400 Hz and 1625–3400 Hz, respectively. This is why filter 42 is made of four pass-band filters designated by HP1 through HP4 associated with switches 44 and 46. The information relative to the transmission rate, which may be determined by conventional means, is used to select the filter to be used. In other words, the received message will include a message indicating the selected transmission rate and this message is used to control switches 44 and 46. In practice, filters HP1 through HP4 will be transversal digital filters sharing the same delay line.

Furthermore, since some sounds, such as, for instance, the fricatives, provide a very weak low-band energy level, the signal energy provided by device 40 (DISTORT) may be insufficient with regard to the requirements of the decoder according to this invention. Energy supplied by a white noise-generator 48 (WN) has, therefore, been added at the output of device (DIST) 40. The level of this energy shall be adjusted so that it fulfills its functions with sounds carrying a low energy in the low-frequency bandwidth without disturbing the operation when voiced sounds are being processed. The white noise shall thus be of a low amplitude when compared to the energy carried by the high frequency bandwidth of voiced sounds. The generator (WN) can be adjusted empirically or dynamically. The signal resulting from the white noise being added to the information provided by device 40 (DISTORT) is fed into one of the band-pass filters 42.

Figure 6:
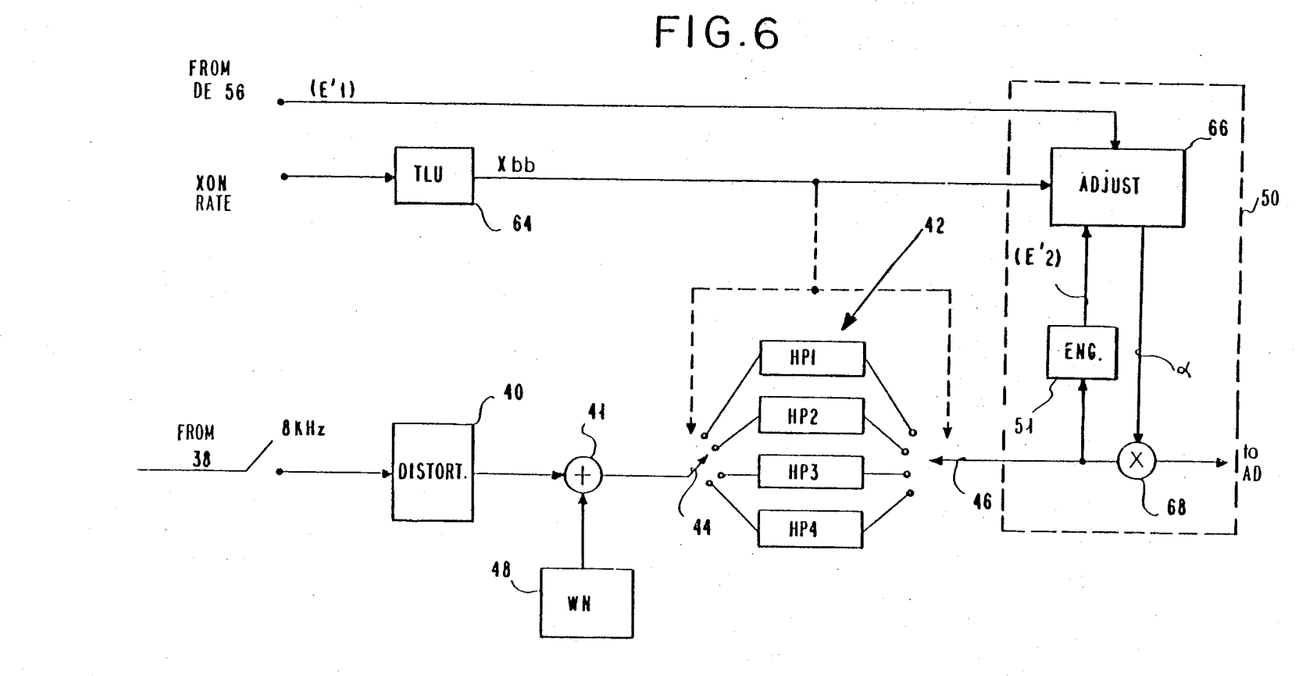
FIG. 6 shows details of part of the receiver of FIG. 5.

The output samples of filter 42 are fed into the energy adjustment device 50 (EAD) which normalizes the high band level. As shown in FIG. 6 such a normalization is obtained by measuring in a device ENG (51) the energy $E'2$ of the filter 42 output; comparing $E'2$ with the energy $E'1$, where $E'1$ designates E1 and/or E2 provided by the decoder DEC 1 of channel ENERG conveying terms E representative of the energy in the 1625–3400 Hz frequency band; and, finally, modulating the filter 42 output signal by the result of such a comparison. The output of device 50 is added to the output of interpolator 38 in AD. The resulting signal is filtered by digital lattice filter 52 ($\overline{INVF}$) having for coefficients PARCORS coefficients supplied by channel COEF and decoded in 54 (DEC 2).

It should be noted that delay elements 56 (DL3), 57 (DL4) and 59 (DL6) have been added into the various original paths within the receiver of FIG. 5. These delay elements are intended to resynchronize the data of the various paths with one another.

FIG. 6 illustrates an embodiment of the circuit 39 (HB) of FIG. 5. It should be noted, first, that the information indicative of the transmission rate is used to address a table 64 used to designate the filter HP1 through HP4, which should be used. Such an information controls switches 44 and 46. Table 64, in addition, is indicative of the value Xbb of the lower frequency of the filter HP1 through HP4 which has been selected. The $X_{bb}$ value is provided to adjusting circuit 66 also connected to decoder 55 supplying parameter $E'1$, and to device ENG 51 supplying parameter $E'2$. The adjustment circuit 66 calculates term α

$$\alpha = \sqrt{\frac{3400 - Xbb}{3400 - 1625} \cdot \frac{E'1}{E'2}}.$$

The term α is used to modulate in 68 the information provided by filter 42.

The sub-band coding processes and, more particularly, the above-described process, lend themselves particularly well to the concentration of a plurality of speech signals sources, into a single transmission channel.

Figure 7:
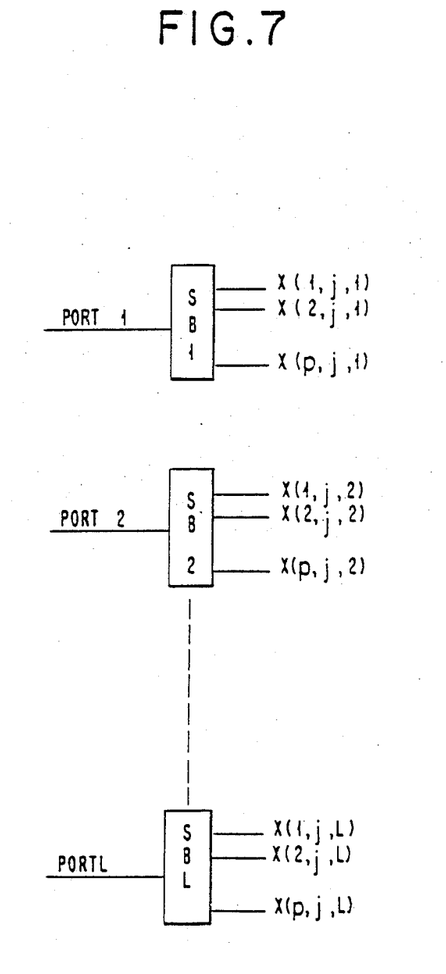
FIGS. 7 and 8, are embodiments of this invention applied to several sources.

FIG. 7 illustrates the schematic diagram of a device adapted to serve "L" signal sources connected to ports designated by PORT1 through PORTL, respectively. Each port is connected to a filter bank SB1, SB2, ..., or SBL.

A coding operation using an optimal dynamic allocation of the quantization bits on the various ports, can be carried out in a global manner upon the whole p.L sub-band signals. To this end, the following operations would be carried out:

Determining the characteristics $$C(i,k) = \underset{j=1,N}{\text{Max}}\ (|X(i,j,k)|)$$

for $i = 1, \ldots, p$
$k = 1, \ldots, L.$

Coding the characteristics;

Controlling the activity of the ports and dynamically allocating the (re)quantization bits to the sub-band signals so that:

$$n(i,k) = \frac{1}{p \cdot L}\left[ M.L - \sum_{j=1}^{p} \sum_{k=1}^{L} \log \tilde{C}(j,k) \right] + \log \tilde{C}(i,k) \quad (15)$$

for
$$i = 1, \ldots, p \quad (16)$$
$$k = 1, \ldots, L$$

with in addition the constraint:

$$\sum_{k=1}^{L} \sum_{i=1}^{p} n(i,k) = M.L \quad (17)$$

Adjusting the n(i,k)'s by truncating them to the nearest integer value. These integer values would be limited to a predetermined number of values such as 0, 1, 2, 3, 4, 5 for instance. Then, the values of n(i,k) would be adjusted so that expressions (15) through (17) are met; and (Re)quantizing the samples in each sub-band.

Such a process would have the advantage to provide for a dynamic allocation coding means extended to the p.L sub-bands. Such a process, however, may have a few drawbacks when applied to the TASI type system of this invention. A preferred method will now be described, which is of particular interest. This method is based on the application of the above-described multirate coding principles.

Such a method includes the following steps of:

Coding the speech information supplied by each signal source by applying the above-mentioned multirate coding techniques.

Measuring the relative activity of each source;

Selecting a coding rate to be allocated to each souce according to said relative activity;

Selecting part of the multirate frame format for each source according to the allocated coding rate; and, Multiplexing the eventually truncated macro-samples thus obtained.

Figure 8:
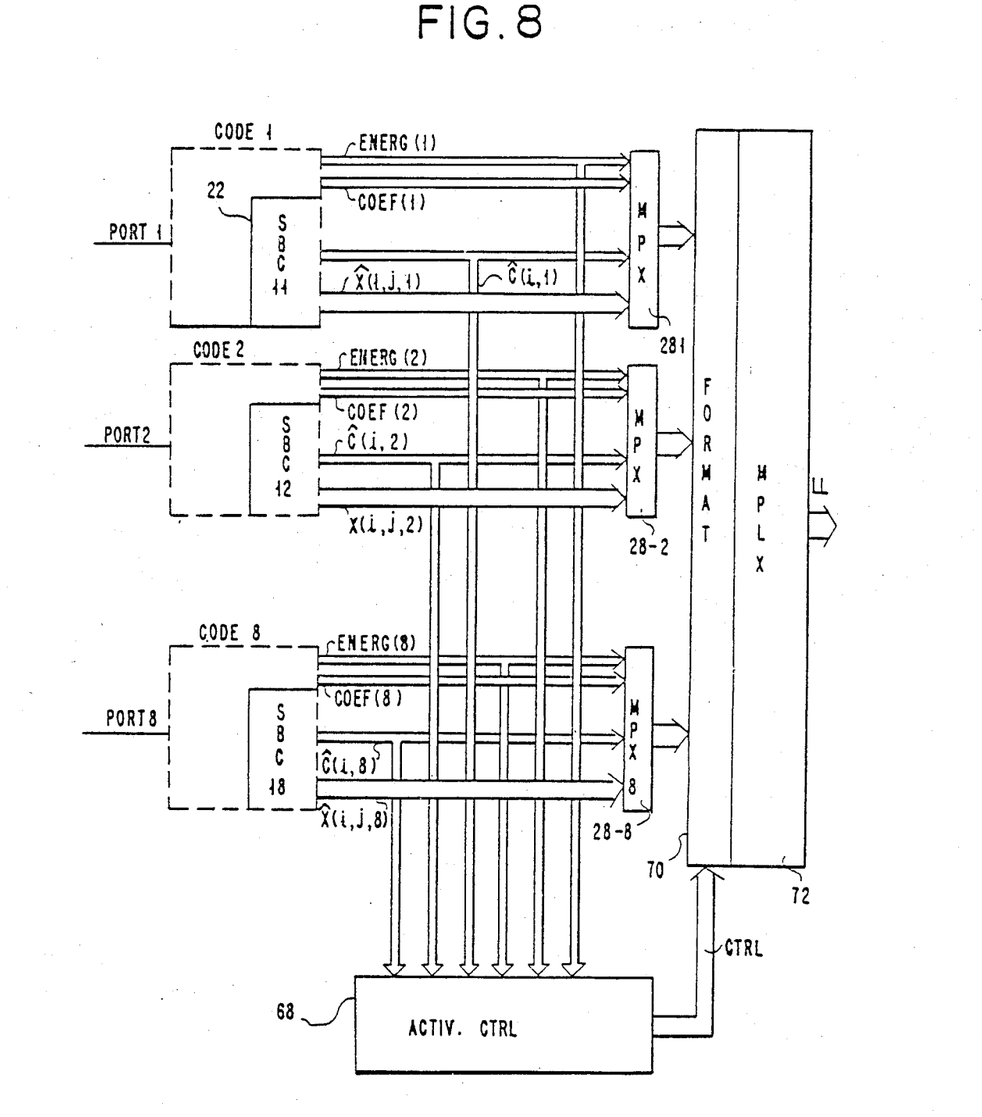

FIG. 8 illustrates an embodiment of the device for concentrating signals from L=8 signal sources, over a single transmission channel LL. The speech signals originating from each of the eight sources (not shown) are fed to a series of ports referenced PORT1 through PORT8. Each port is connected to a coder performing sub-band (i.e. CODE1 through CODE8) coding with dynamic allocation of the coding bits. Each coder may be of the type shown in FIG. 2. More specifically, two groups of terms (i,j) and (i,j,k) are supplied by a residual base-band sub-band coder. The multiplexer MPX of each coder supplies bit blocks arranged according to the above-described multirate format (see FIG. 4).

An activity controller 68 determines the relative activity of each signal source and derives therefrom the transmission rate, i.e. the bit rate V(k), to be assigned to said source. The terms V(k), once adjusted, define the way the bit blocks arranged according to the multirate format corresponding to a sample block of source (k), have to be truncated. Such a formatting operation is carried out in 70. Finally, the data of the eight coders are multiplexed in MPLX 72 for their being transmitted over line LL.

The operations for determining the relative port activity and for defining the transmission rate to be assigned to each port, are based upon the application of formulas (15) through (17). But the direct application of these formulas raises a readjustment problem. First, a port bit rate must be calculated:

$$V(k) = \sum_{i=1}^{p} n(i,k) \quad (18)$$

which must be adjusted so as to be equal to one of the values indicated in Table I under the title: "Number of bits for each macro-sample".

Then, there must be obtained:

$$\sum_{k=1}^{L} V(k) = M \cdot L = Nc \quad (19)$$

where Nc is equal to that portion of channel LL which is available for the transmission of the macro-samples on the ports.

Now, the application of formulas (18) and (19) require readjustments and any action upon either of them affects the other, which makes the process all the more complicated. In order to avoid such a drawback, it is advisable to divide the problem into two.

Indeed, there can be deduced from formula (15):

$$\sum_{i=1}^{p} n(i,k) = \quad (20)$$

$$\sum_{i=1}^{p} \left[ \frac{1}{pL}\left[ ML - \sum_{j=1}^{p} \sum_{l=1}^{L} \log \tilde{C}(j,l) \right] + \log \tilde{C}(i,k) \right]$$

whence $$V(k) = \frac{1}{L}\left[ ML - \sum_{l=1}^{L} \sum_{j=1}^{p} \log \tilde{C}(j,l) \right] + \sum_{i=1}^{p} \log \tilde{C}(i,k) \quad (21)$$

When writing:

$$W(l) = \sum_{j=1}^{p} \log \tilde{C}(j,l) \quad (22)$$

where W(k) is indicative of the PORTk activity.

Then, there is obtained:

$$V(k) = \frac{1}{L}\left[ ML - \sum_{l=1}^{L} W(l) \right] + W(k) \quad (23)$$

where l is a calculation index which is varied from l=1 to à l=L to scan the assembly of ports PORT1 through PORTL.

Formula (23) is indicative of an optimal dynamic distribution of the ML bits intended for the coding operation of the signals on the L ports as a function of the activity W(k) thereof.

Besides, it should be noted, here, that instead of determining the activity W(k) of the $k^{th}$ port of order k from formula (22), one can sort elements of information substantially proportional to the energy in each sub-band, namely terms $\tilde{C}(i,k)$. Thus:

$$W'(k) = \log \mathrm{Max}[\tilde{C}(i,k)] \quad (22')$$
$$i = 1, 2, \ldots, p$$

The results can be further improved by taking also the high frequency band energies ENERG(k), namely terms E(1,k) and/or E(2,k), into account and by making use of $$W'(k) = \frac{1}{2} \log \ \mathrm{Max}[\ (\tilde{C}(i,k))^2, \lambda \cdot \mathrm{ENERG}(k)] \quad (22'')$$
$$i = 1, 2, \ldots, p$$

An expression wherein $\lambda$ is a digital coefficient empirically determined and intended to take into account the statistical differences in the energy distribution between the high frequency bands and the low frequency bands of the speech signal spectrum.

Formula (23) becomes:

$$V(k) = \frac{1}{L}\left[ ML - \sum_{l=1}^{L} W'(l) \right] + W'(k) \quad (23')$$

The above formula (23') acts against low level locutors when confronted to higher level locutors. This can be remedied by normalizing the terms used as a reference to the measurement of the energy generated by the various locutors. A new term W''(k) is then, defined, which defines a weighted source activity as a function of the prior activity of this very source:

$$W''(k) = \frac{W'(k)}{<W'(k)>} \quad (24)$$

where $<W'(k)>$ is representative of the W'(k)'s over a relatively long period of time, of the order of the syllabic time length (0.5 through 2 seconds, for instance). Besides, a threshold which shall not be exceeded, is assigned to term W'(k).

Therefore, the activity controller 68 is fed with C(i,k) terms and starts with decoding them using a logarithmic table look-up method. Said table performs the opposite operations of those performed with the table used to convert the C(i,k)'s into C(i,k). This decoding operation provides terms $\tilde{C}(i,k)$. Controller 68 receives also the energy information, namely, E(1,k) and/or E(2,k). The operations according to equations (22'') and (24) are carried out in 68. They are followed by the carrying out of the operations of equation (23') which defines the bit rate V(k), and therefore the transmission rate, to be allocated to each source for the 20 ms long segment of signal being under process. Such information is used to eventually truncate in a device 70 the multirate block provided by each source into the desired format. The bit block from each source, then, are time-multiplexed in device 72 before transmission on line LL.

It is clear that the preceding description has only been given as an unrestrictive example, and that numerous alternatives can be considered without departing from the spirit and scope of this invention.

We claim:

1. A method for digitally transmitting a limited frequency band speech signal at a given transmission rate chosen from amongst a group of predetermined different transmission rates, said method including the steps of:
    sampling and digitally coding said speech signal;
    selecting at least part of said frequency band represented by said digitally coded speech signal;
    dividing said selected frequency band into a fixed number of sub-bands;
    regrouping said sub-bands into subgroups, each of said sub-groups being assigned to one of said predetermined different transmission rates;
    quantizing the sub-band signals in each of said sub-groups by dynamically allocating the quantizing bits among the sub-bands in each of said sub-groups and quantizing each sub-group at a rate which is a function of the transmission rate assigned to each said sub-group;
    multiplexing said quantized sub-band signals by arranging the bits obtained from said coding and the bits obtained from said quantizing of said sub-band signals into a multirate frame comprising a plurality of zones;
    ordering said plurality of zones from most significant to least significant, said most significant zone receiving those bits which are most significant to the reconstruction of said speech signal, said most significant zone corresponding to the lowest of said transmission rates, each remaining successive zone of said plurality of zones of successively lesser significant order and corresponding to successively higher of said transmission rates receiving those bits from said coding and said quantizing which are of successively lesser significance to the reconstruction of said speech signal; and
    selecting for transmission all or a portion of said multirate frame, said portion being commenced with said most significant zone, said portion continuing, if at all, with the next zone of said successively lesser significant order, the number of said zones in said transmission being a function of said given transmission rate.

2. A digital transmission method according to claim 1 wherein block companded pulse coded modulation (BCPBM) techniques are used in quantizing the sub-band signals.

3. A digital transmission method according to claim 1 wherein voice excited predictive coder (VEPC) techniques are used in quantizing the sub-band signals and wherein said selecting at least one part of said frequency band is limited to selecting the residual base-band of said speech signal.

4. A method for concentrating speech signals from a plurality of sources over a single transmission channel, including handling of the signal from each of said plurality of sources according to the method of claim 1, including the additional steps of allocating a transmission rate to each of said plurality of sources as a function of the activity of said source with respect to those of the other sources within said plurality of sources.

5. A method for digitally transmitting a speech signal at a given transmission rate chosen from amongst a group of predetermined different transmission rates, said method including the steps of:
    sampling and digitally coding said speech signal;
    receiving the coded speech signal and generating partial auto correlation (PARCOR) coefficients;
    recoding said PARCOR coefficients;
    extracting from said coded speech signal and said PARCOR coefficients a residual signal;

filtering said residual signal and providing a residual base band signal and an information signal indicative of the energy in the high frequency band of said residual signal;

recoding said filtered residual base band signal and said high frequency band energy signal;

splitting said filtered residual base band signal into a plurality of sub-bands;

regrouping said sub-bands into subgroups, each of said sub-groups being assigned to one of said predetermined different transmission rates;

quantizing the sub-band signals in each of said sub-groups by dynamically allocating the quantizing bits among the sub-bands in each of said sub-groups and quantizing each sub-group at a rate which is a function of the transmission rate assigned to each said sub-group;

multiplexing said quantized sub-band signals by arranging the bits representing the energy of said high frequency band of said residual signal, the PARCOR bits, and the bits obtained from said quantizing into a multirate frame comprising a plurality of zones;

ordering said plurality of zones from most significant to least significant, said most significant zone receiving those bits which are most significant to the reconstruction of said speech signal, said most significant zone corresponding to the lowest of said transmission rates, each successive remaining zone of said plurality of zones of successively lesser significant order and corresponding to successively higher of said transmission rates receiving those bits from said coding and said quantizing which are of successively lesser significance to the reconstruction of said speech signal; and, selecting for transmission all or a portion of said multirate frame, said portion being commenced with said most significant zone, said portion continuing, if at all, with the next zone of said successively lesser significant order, the number of said zones in said transmission being a function of said given transmission rate.

6. A transmission method according to claim 5 wherein block companded pulse coded modulation (BCPCM) techniques are used in quantizing the sub-band signals.

7. A transmission method according to claim 6 wherein said high frequency energy information is recoded at least once per BCPCM block duration.

8. A method for digitally transmitting a limited frequency band speech signal at a given transmission rate chosen from amongst a group of predetermined different transmission rates, said method including the steps of:

sampling and digitally coding said speech signal;

selecting at least part of said frequency band represented by said digitally coded speech signal;

dividing said selected frequency band into a fixed number of sub-bands;

regrouping said sub-bands into subgroups, each of said sub-groups being assigned to one of said predetermined different transmission rates;

quantizing the sub-band signals in each of said sub-groups by dynamically allocating the quantizing bits among the sub-bands in each of said sub-groups and quantizing each sub-group at a rate which is a function of the transmission rate assigned to each said sub-group;

multiplexing said quantized sub-band signals by arranging the bits obtained from said coding and the bits obtained from said quantizing of said sub-band signals into a multirate frame comprising a plurality of zones wherein at least one of said zones includes sub-band signals from sub-bands separated in frequency from each other by one or more sub-bands not included in said zone;

ordering said plurality of zones from most significant to least significant, said most significant zone receiving those bits which are most significant to the reconstruction of said speech signal, said most significant zone corresponding to the lowest of said transmission rates, each remaining successive zone of said plurality of zones of successively lesser significant order and corresponding to successively higher of said transmission rates receiving those bits from said coding and said quantizing which are of successively lesser significance to the reconstruction of said speech signal; and, selecting for transmission all or a portion of said multirate frame, said portion being commenced with said most significant zone, said portion continuing, it at all, with the next zone of said successively lesser significant order, the number of said zones in said transmission being a function of said given transmission rate.

9. A digital transmission method according to claim 8 wherein block companded pulse code modulation (BCPCM) techniques are used in quantizing the sub-band signals.

10. A digital transmission method according to claim 8 wherein voice excited predictive coder (VEPC) techniques are used in quantizing the sub-band signals and wherein said selecting at least one part of said frequency band is limited to selecting the residual base-band said speech signal.

11. A method for digitally transmitting a speech signal at a given transmission rate chosen from amongst a group of predetermined different transmission rates, said method including the steps of:

sampling and digitally coding said speech signal;

receiving the coded speech signal and generating partial auto correlation (PARCOR) coefficients;

recoding said PARCOR coefficients;

extracting from said coded speech signal and said PARCOR coefficients a residual signal;

filtering said residual signal and providing a residual base band signal and an information signal indicative of the energy in the high frequency band of said residual signal;

recoding said filtered residual base band signal and said high frequency band energy signal;

splitting said filtered residual base band signal into a plurality of sub-bands;

regrouping said sub-bands into subgroups, each of said sub-groups being assigned to one of said predetermined different transmission rates;

quantizing the sub-band signals in each of said sub-groups by dynamically allocating the quantizing bits among the sub-bands in each of said sub-groups and quantizing each sub-group at a rate which is a function of the transmission rate assigned to each of said sub-group;

multiplexing said quantized sub-band signals by arranging the bits representing the energy of said high frequency band of said residual signal, the PARCOR bits, and the bits obtained from said quantizing into a multirate frame comprising a plurality of zones wherein at least one of said zones includes sub-band signals from sub-bands separated in frequency from each other by one or more sub-bands not included in said zone;

ordering said plurality of zones from most significant to least significant, said most significant zone receiving those bits which are most significant to the reconstruction of said speech signal, said most significant zone corresponding to the lowest of said transmission rates, each successive remaining zone of said plurality of zones of successively lesser significant order and corresponding to successively higher of said transmission rates receiving those bits from said coding and said quantizing which are of successively lesser significance to the reconstruction of said speech signal; and, selecting for transmission all or a portion of said multirate frame, said portion being commenced with said most significant zone, said portion continuing, if at all, with the next zone of said successively lesser significant order, the number of said zones in said transmission being a function of said given transmission rate.

12. A transmission method according to claim 11 wherein block companded pulse code modulation (BCPCM) techniques are used in quantizing the sub-band signals.

13. A transmission method according to claim 12 wherein said high frequency energy information is recoded at least once per BCPCM block duration.

* * * * *